United States Patent

Piock et al.

[11] Patent Number: 5,988,136
[45] Date of Patent: Nov. 23, 1999

[54] METHOD OF INTRODUCING FUEL INTO THE COMBUSTION CHAMBER OF AN INTERNAL COMBUSTION SPARK-IGNITION ENGINE WITH DIRECT FUEL INJECTION

[75] Inventors: Walter Piock; Martin Wirth, both of Hitzendorf, Austria

[73] Assignee: AVL List GmbH, Graz, Austria

[21] Appl. No.: 09/041,673

[22] Filed: Mar. 13, 1998

[30] Foreign Application Priority Data

Mar. 14, 1997 [AT] Austria .................................. 160/97 U

[51] Int. Cl.[6] .................................................. F02B 17/00
[52] U.S. Cl. .......................................... 123/295; 123/305
[58] Field of Search ..................................... 123/295, 305

[56] References Cited

U.S. PATENT DOCUMENTS

| | | | |
|---|---|---|---|
| 4,955,339 | 9/1990 | Sasaki et al. | 123/295 |
| 5,078,107 | 1/1992 | Morikawa et al. | 123/295 |
| 5,313,920 | 5/1994 | Matsushita | 123/295 |
| 5,718,203 | 2/1998 | Shimada et al. | 123/305 |
| 5,749,334 | 5/1998 | Oda et al. | 123/305 |
| 5,778,857 | 7/1998 | Nakamura et al. | 123/425 |
| 5,873,344 | 2/1999 | Kudou et al. | 123/295 |

FOREIGN PATENT DOCUMENTS

| | | |
|---|---|---|
| 0598941A1 | 6/1994 | European Pat. Off. . |
| 0741237A3 | 2/1997 | European Pat. Off. . |
| 1437447 | 5/1976 | United Kingdom . |

*Primary Examiner*—John Kwon
*Attorney, Agent, or Firm*—Watson Cole Grindle Watson, P.L.L.C.

[57] ABSTRACT

In order to reduce $No_x$ and HC emissions during starting and warm-up of a throttled internal combustion spark-ignition engine with direct injection, the beginning of fuel injection into the combustion chamber is shifted into the compression phase, while the total air ratio $\lambda$ is 1 or slightly lean.

5 Claims, 2 Drawing Sheets

METHOD OF INTRODUCING FUEL INTO THE COMBUSTION CHAMBER OF AN INTERNAL COMBUSTION SPARK-IGNITION ENGINE WITH DIRECT FUEL INJECTION

BACKGROUND OF THE INVENTION

This invention relates to a method of introducing fuel into the combustion chamber of an internal combustion spark-ignition engine with direct fuel injection, which is throttled during part-load operation.

DESCRIPTION OF THE PRIOR ART

Known designs for direct injection in spark-ignition engines may be divided into two groups as regards mixture preparation. One group is formed by direct injection systems designed for homogeneous operation, which utilize the superior full-load potential compared to that of injection by suction pipe. Although this very simple combustion design will meet the strictest emission regulations its advantages concerning fuel consumption are only slight. The other group of direct injection systems in spark-ignition engines is designed for inhomogeneous or statified operation, which is essential if the engine is to be largely unthrottled under part-load conditions in order to obtain significant advantages in fuel consumption. Spark-ignition engines with charge stratification are described in EP 0 598 941 B1, and EP 0 741 237 A1, for instance.

Unlike in direct-injection diesel engines, where fuel injection takes place immediately before combustion, fuel injection in direct-injection spark-ignition engines must take place at an earlier point in time to form an ignitable mixture in the combustion chamber, as fuel transport and preparation must be taken into account.

In throttled internal combustion engines with direct injection as described above, fuel injection begins at 320° to 250° crank angle before upper dead centre. In this way satisfactory homogenization may be achieved in the combustion chamber of an engine running at operating temperature, and, as a consequence, similar emission levels may be reached as in conventional operation with suction pipe injection. The disadvantage of this principle is that the levels of hydrocarbon emissions encountered during starting and warm-up are similarly high as in engines with suction pipe injection. By retarding ignition in this phase it is possible to reduce HC emissions by some 20%. This will lead to a certain increase in fuel consumption, which is acceptable, though, during the short warm-up period. The extent of ignition retardation is limited by cyclical fluctuations.

SUMMARY OF THE INVENTION

It is an object of the present invention to further reduce emissions during the starting and warm-up phase of a throttled spark-ignition engine with direct fuel injection.

In the invention this object is achieved by shifting the beginning of fuel injection into the phase of the compression stroke during starting and/or warm-up.

It has been found that both $NO_x$ emissions and HC emissions may be reduced considerably by postponing the beginning of fuel injection, which will lead to a delay in combustion, and, as a consequence, lower peak temperatures and higher final temperatures in the combustion process. The significant drop in combustion peak temperatures will reduce the production of $No_x$ emissions. On the other hand the delay in combustion will increase hydrocarbon oxidation on account of the higher temperatures prevailing towards the end of the combustion process, which will have an advantageous effect on HC emission levels. The beginning of injection is set at a point in time approximately between 160° crank angle before upper dead centre and 70° crank angle before upper dead centre. Due to the higher temperature of the combustion gas the warm-up phase will be shortened as the catalytic converter will respond much more quickly.

During the starting and warm-up phase of the throttled engine the injection volume is chosen such that the total air ratio λ is 1 or slightly lean.

It has been found that although setting the beginning of injection as proposed by the invention will dramatically reduce $NO_x$ and HC emissions, this may be accompanied by an increase in carbon emissions. To avoid this drawback it is provided in further development of the invention that a high turbulence level of the internal flow in the cylinder be created before and/or during combustion. Turbulence-enhancing measures are well-known and may comprise the shaping of the piston recess and/or a particular configuration of the inlet ports (cf. EP 0 598 941 B1, or EP 0 741 237 A1). Carbon emissions may be further reduced by inducing charge stratification after fuel injection. Suitable measures promoting charge stratification also are known from the publications referred to above.

DESCRIPTION OF THE DRAWINGS

The invention will now be further described with reference to the accompanying diagrams, where

FIG. 1a shows the cylinder pressure p plotted against the crank angle KW, curve $p_Z$ denoting the cylinder pressure with ignition, and $p_o$ the cylinder pressure without ignition. FIG. 1b presents the valve lifts $H_E$ and $H_A$ for intake and exhaust valve. FIG. 1c shows the beginning of fuel injection against the crank angle KW. In conventional spark-ignition engines with direct injection and homogeneous operation the beginning of injection $E_1$ usually takes place after the exhaust valve has closed, i.e., at 320° crank angle KW before upper dead centre OT. According to the invention the beginning of injection $E_2$ is shifted into the compression phase, for instance towards the time when the intake valve closes, or later.

In FIGS. 2 to 4 curve 1 represents a beginning of injection which is set at 320° crank angle KW before upper dead centre OT, a timing which is used in known types of direct-injection spark-ignition engines. Curve 2 represents a setting of 130° crank angle KW before upper dead centre OT for the beginning of injection, as proposed in a first variant of the invention, curve 3 represents a beginning of injection at 110° crank angle KW before upper dead centre OT, as put forward in a second variant of the invention.

In FIG. 2 the heat release Q is plotted against the crank angle KW. As is seen clearly the heat release peak value for curves 2 and 3 representing the variants of this invention is significantly lower than the peak value of curve 1. This will result in considerably lower peak temperatures during combustion. On the other hand the final combustion temperature in the examples represented by curves 2 and 3 is significantly higher due to the late end of combustion than in the previously employed injection schedule represented by curve 1. The total air ratio λ is about 1.0 during starting and warm-up, or slightly lean (1.0≦λ≦1.4).

FIG. 3 shows the relative hydrocarbon emissions HC against the relative increase in fuel consumption Δf, which refers to a fuel-optimized setting for the beginning of injection at 320° crank angle KW before upper dead centre OT, for a homogeneous mixture ratio and optimum ignition point. By retarding the beginning of injection and providing charge stratification in the combustion chamber, as is proposed by the present invention, it will be possible to reduce HC emissions at the fuel-optimized point by about 50% if the beginning of injection is set at 130° crank angle KW before upper dead centre OT (curve 3), and to about 30% of conventional designs if the beginning of injection is set at 110° crank angle KW before upper dead centre OT. Although the method of fuel introduction proposed by the invention will lead to a slight increase in fuel consumption Δf of about 10%, this is considered of little importance, since the starting and warm-up phase of the engine and thus the time of increased fuel consumption due to injection timing is limited to a very short period. After starting and warm-up the moment of injection for homogeneous operation is shifted back into the phase of the intake stroke.

In FIG. 4 the relative nitric oxide emissions $NO_X$ are plotted against the relative increase in fuel consumption Δf, i.e., on the one hand for a conventional injection moment of 320° crank angle KW before upper dead centre OT as represented by curve 1, assuming a homogeneous mixture and optimum ignition point, and on the other hand for the two variants of the invention, operating on stratified charge at an air ratio of λ=1, with the beginning of injection set at 110° crank angle before upper dead centre (curve 2) and 130° crank angle before upper dead centre (curve 3), respectively. It should be noted that a greater reduction of $NO_X$ emissions is possible (i.e., to about 30–40% of emissions obtained with conventional injection timing), if the beginning of injection is set at 130° KW before OT (curve 2), than if the even later injection moment of 110° KW before OT is chosen (curve 3).

Figure 1A:
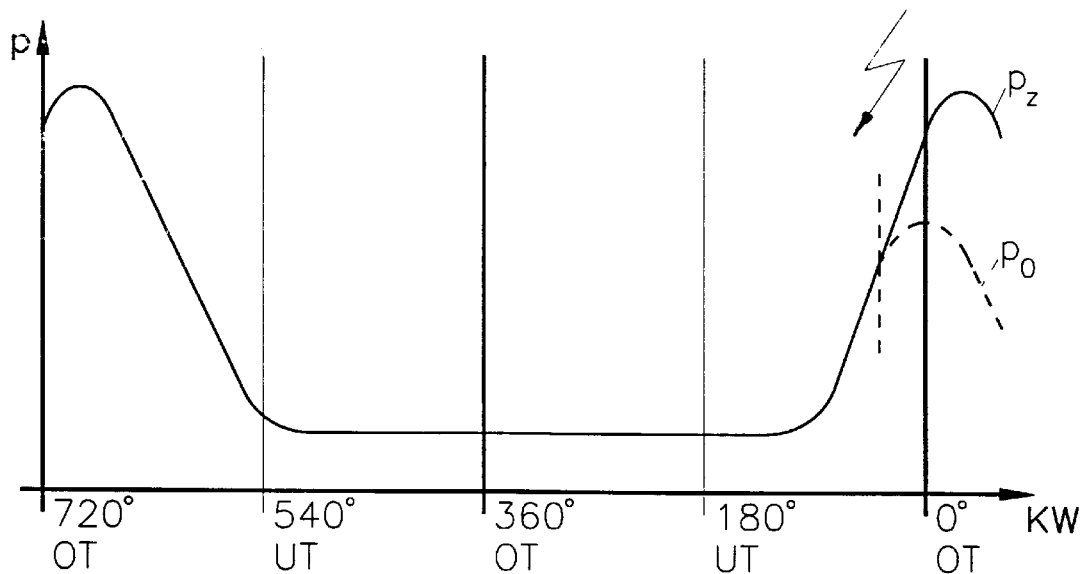
FIG. 1a is a diagram of cylinder pressure against crank angle.
Figure 1B:
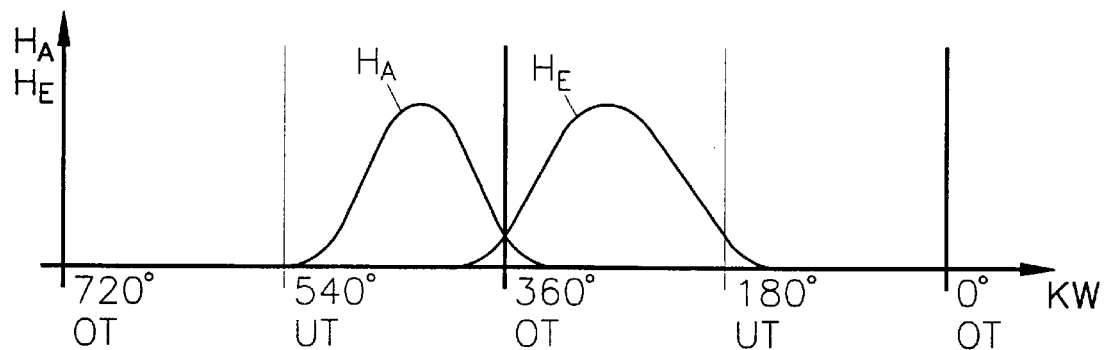
FIG. 1b is a diagram of valve lift against crank angle.
Figure 1C:
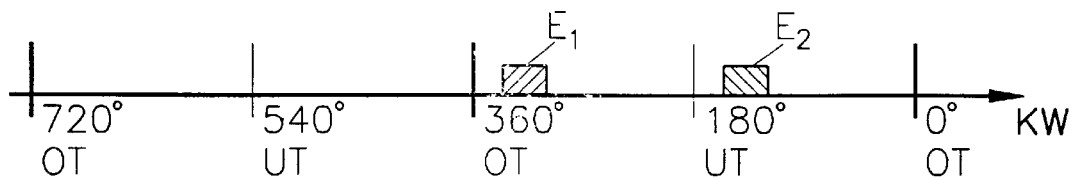
FIG. 1c is a diagram showing injection times.
Figure 2:
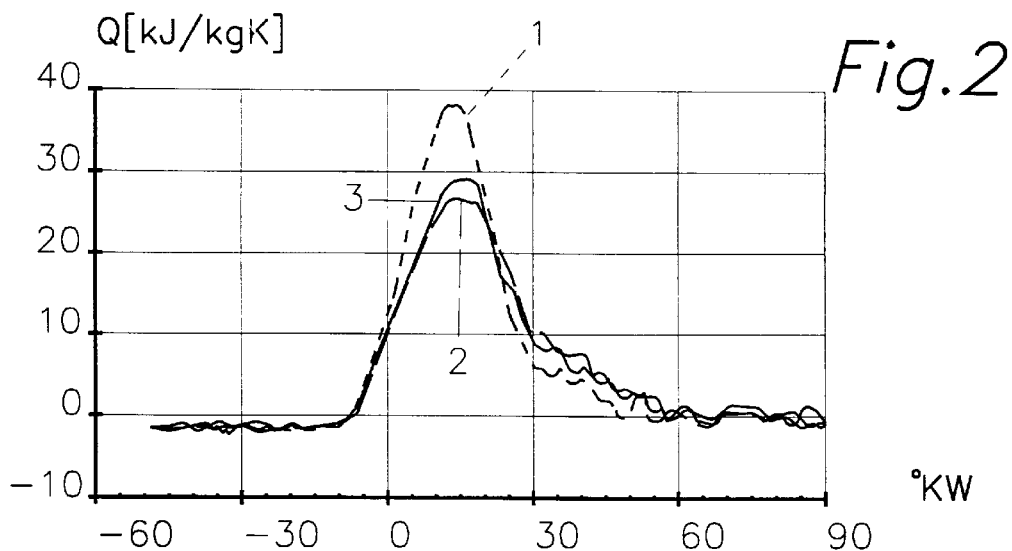
FIG. 2 is a diagram of heat release against crank angle.
Figure 3:
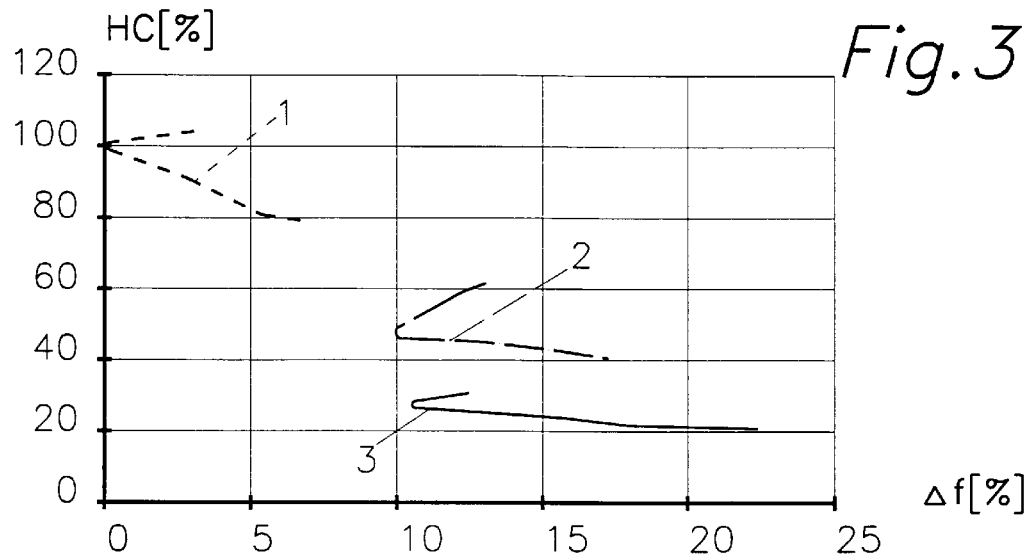
FIG. 3 is a diagram of HC emissions against fuel consumption.
Figure 4:
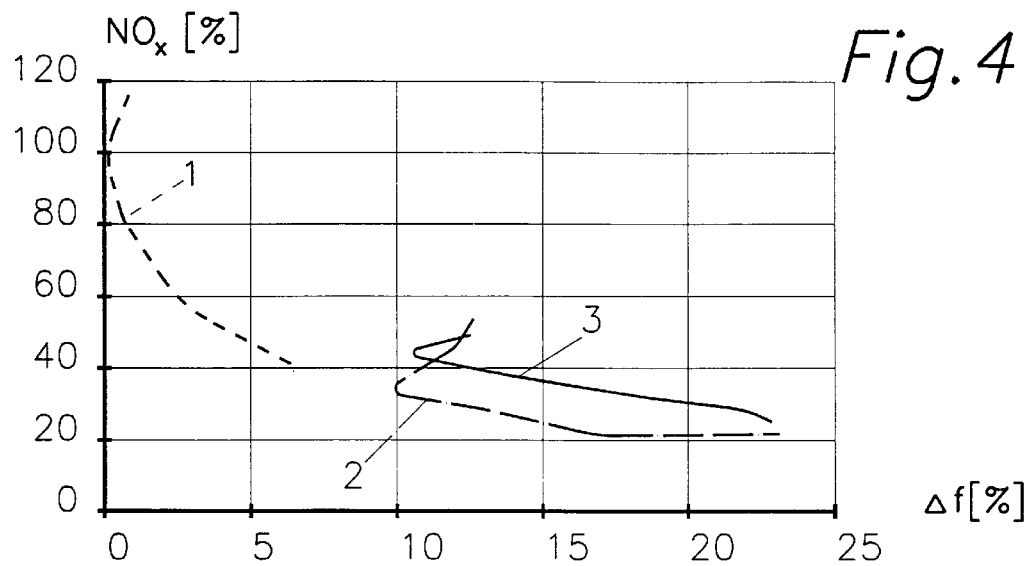
FIG. 4 is a diagram of $NO_x$ emissions against fuel consumption.

A comparison of FIGS. 3 and 4 shows that the best results to be obtained for HC emissions and $No_X$ emissions would need different settings for the beginning of injection; if the injection moment is to be optimized with regard to both NOx and HC emissions, the beginning of injection should therefore be set between 110° crank angle KW and 130° crank angle KW, i.e., at about 120° crank angle KW before upper dead centre OT.

Contrary to known methods of direct injection in spark-ignition engines with stratified charge and largely unthrottled operation, the method proposed by the invention provides that the engine be strongly throttled during the starting and warm-up phase, and that charge stratification and a stoichiometric mixture ratio prevail during that operating period, so that emission levels will improve significantly.

We claim:

1. A Method of introducing fuel into the combustion chamber of an internal combustion spark-ignition engine with direct fuel injection, which is throttled during part-load operation, wherein the beginning of fuel injection is shifted into the phase of the compression stroke during one of starting and warm-up operation phases of the engine.

2. A Method as claimed in claim 1, wherein the beginning of injection is set at a point in time between 160° crank angle (KW) before upper dead centre (OT) and 70° crank angle (KW) before upper dead centre (OT).

3. A Method as claimed in claim 1, wherein the injection volume during the starting and warm-up phase is chosen such that the total air ratio λ is 1 or slightly lean.

4. A Method as claimed in claim 1, wherein a high turbulence level of the internal flow in the cylinder is created before and/or during combustion.

5. A Method as claimed in claim 1, wherein charge stratification is induced after fuel injection.

* * * * *